Patented June 29, 1943

2,322,928

UNITED STATES PATENT OFFICE 2,322,928

COLOR PRINTING METHOD

Pierre Drewsen and John R. Little, Sandusky, Ohio, assignors to The Hinde & Dauch Paper Company, Sandusky, Ohio, a corporation of Ohio No Drawing. Original application September 2, 1938, Serial No. 228,212. Divided and this application May 27, 1941, Serial No. 395,432

6 Claims. (Cl. 117—83)

This application is a division of the co-pending application of Pierre Drewsen and John R. Little, Serial No. 228,212, filed September 2, 1938 for "Color printing." The invention to which this particularly relates is a method of coloring paper and other sheet material, particularly useful for bleed-proof coloring.

In particular we propose dissolving rosin in aqua ammonia, mixing therewith zein pre-treated with aqua ammonia, adding color to the mixture, and using the composition substantially as an ink. This may or may not be followed by overprinting with the same composition, either uncolored, as a transparent protective coating, or carrying transparent colors for composition effects. For pre-treatment of the zein and for dissolution of the rosin we may substitute NaOH or KOH for NH4OH, but prefer the latter because it is a milder reagent, which can be handled with less care.

The foregoing principles can be applied using compositions having some variation in detailed formula, but those which follow are successful in practice.

Steps 1, 1A and 2 show the fundamental or ground coat, which is the color vehicle. There is no particular time relation between Steps 1 and 1A, that is, they need not be in sequence.

STEP 1—*Prepared zein*

To 100 pints cold water, add
50 lbs. zein (dry weight), and
4 pints aqua ammonia Stir vigorously, keeping the mixture cool enough (below about 100° F.) to prevent agglomeration of the zein.

STEP 1A—*Ammonium resinate*

To 3 gals. hot water add simultaneously
6½ pints aqua ammonia, and
25 lbs. powdered rosin (dry weight).

Keep heated and stir until dissolved. Heating temperatures are not critical but must not be great enough to drive off too much ammonia, hence a range below 200° F. is satisfactory; enough ammonia must stay to keep the rosin dissolved.

In Steps 1 and 1A, NaOH or KOH may be substituted for NH4OH, or the zein resinate may be made according to Formula B or Formula C.

*Formula B*

20 lbs. zein (dry weight)
10 lbs. rosin (dry weight)
100 lbs. water
1 to 2 lbs. NaOH (or KOH)

*Formula C*

30 lbs. zein
10 lbs. rosin
110 lbs. water
1½ to 2 lbs. NaOH (or KOH)

STEP 2.—*Zein resinate*

The ammonium resinate (Step 1A) composition may be added to the prepared zein (Step 1) as soon as all the rosin is dissolved. As soon as the ammonium resinate is added the zein dissolves and the mixture becomes very thick. Make it up to 400 pints with hot water (the zein can no longer agglomerate), mix for about five minutes. This gives a stable liquid which in view of the presence of rosin soap is evidently an emulsion or dispersion. It can be kept on hand indefinitely and used as the fundamental composition for further work. The compositions of Steps 1 and 1A may be used in various proportions, the practical limits being from equal quantities of rosin and zein to three times as much zein as rosin.

STEP 3

When color printing is to be done, the color room operator takes a quantity of the foregoing stable mixture, and adds thereto coloring material, also adding hot water and a plasticizer if required. In detail, take from 11 to 18 pints of zein resinate (Step 2) and add thereto the required quantity of analine dye in 3.5 to 4 pints hot water mixed with 1 pint or more of sulphonated castor oil.

The aniline dye of Step 3 may be any single dye or mixture appropriate for the color desired, for example, safranine and auramine give a more or less golden red, according to proportions; blues, greens and so on may be employed. Or a quantity of properly ground dry pigment which per se is not water soluble may be used where a pigment color instead of a dye is desired, for example to give greater opacity or light fastness. To give a black paper, carbon black is used, and so on.

The function of the wetting agent, sulphonated castor oil, is to prevent curdling or breaking of the dispersion or emulsion of zein in ammonium resinate which is otherwise caused by residual sodium chloride in the dyes. Consequently castor oil may be omitted if pigments are used instead of dyes or if the dyes are free from sodium chloride or other electrolytes. The use of sulphonated castor oil, however, has been found to be beneficial to subsequent printing.

STEP 4

Print the foregoing on a design roll of the usual type, such for example as that shown in Drewsen Patent No. 2,089,949 of August 17, 1937.

STEP 5

After printing (and after drying the color coat) run the web through another roller, thereby applying the zein coating made according to Formula D, below.

Formula D 16 pints 60% to 95% commercial denatured alcohol
4 pints water

Add thereto with rapid mixing 2 to 5 lbs. powdered zein and
1 to 3 oz. oxalic acid.

This solution is applied by the usual rubber coating roll, and forms a water repellent coating due to the combination of the oxalic acid with the alkali of the preceding coat, whereby zein and rosin or other resin in intimate mixture are rendered entirely insoluble by being freed from any alkaline combination.

Any light volatile solvent for zein may be substituted for the alcohol; for example satisfactory results have been obtained using either, 16 pints water solution of 60% to 95% acetone, or
16 pints 60% to 95% "Cellosolve"
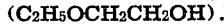
(C₂H₅OCH₂CH₂OH).

Other organic acid of like nature may be substituted for the oxalic. Acetic acid will work so far as the zein is concerned but its generally corrosive nature is injurious to the printing equipment. Also, acetic acid does not make the zein solution quite so fluid as does oxalic.

Any of the foregoing coatings, Formula A, B or C, are fairly bleed-proof when applied by themselves, without the protective coat of Formula D. That is, without the protective coat no appreciable amount of color will come off when the colored sample is held under running water. The addition of the protective coating, however, not merely adds to the bleed-proofing of the color by the physical effect of a transparent top layer, but also fixes the first coat chemically, due to the fact that the solubility of the rosin in the ammonia component of the first coat is destroyed when the first coat is struck by acid. Thereby the rosin, carrying with it the zein and the color, is chemically fixed to the paper or other material on which the printing or coloring is done. When so treated no color will come off on a damp white cloth rubbed over the colored surface several times with a pressure of five pounds or so to the square inch.

Thus it will be seen that we have invented a coloring method which may be of either a moderate or a high quality of resistance to bleeding when wet, and thus adapted selectively either for cheaper or more expensive boxes, particularly of the corrugated board type, and on which printing or coloring of one sort or another is desired, either for ornamentation, for advertising, or for information, but which must resist smearing when handled, and must not rub off on the clothes of customers if carried in wet weather.

Other modes of applying the principle of our invention may be employed instead of the one explained, change being made as regards the composition and method herein disclosed, provided the ingredients or steps stated by any of the following claims or the equivalent of such stated ingredients or steps be employed.

In the claims, the term "aqueous dispersion" is used to include emulsions and dispersions, both of which are distinguishable from true solutions by being coagulated or curdled by the addition of substantial amounts of electrolytes and the like.

We therefore particularly point out and distinctly claim as our invention:

1. In a method of coating a surface of cellulosic material, the steps comprising applying over the surface of the cellulosic material an aqueous dispersion of zein, containing a rosin soap and a coloring material, allowing the coating to dry, and then applying a superposed coating of zein and an acid in a mixture of alcohol and water to react with the previous coat and render it water-resistant.

2. In a method of coating a surface of cellulosic material, the steps which comprise applying on the surface of the cellulosic material an aqueous dispersion of zein, containing an alkali metal rosinate and a coloring material, allowing the coating to dry, and thereafter superimposing a coating containing an acidic material to react with the previous coat and render it water-resistant.

3. In a method of coating a surface of cellulosic material, the steps which comprise applying over a surface of the cellulosic material an aqueous dispersion of zein, containing an alkali metal rosinate and a coloring material to form a colored coating, and thereafter superimposing a coating of zein dissolved in a volatile solvent, said superimposed coating containing an organic acid to react with the previous coat and render it water-resistant.

4. The method of claim 3 wherein the alkali metal rosinate is at least in part sodium rosinate.

5. The method of claim 3 wherein the alkali metal rosinate is at least in part ammonium rosinate.

6. The method of claim 3 wherein the alkali metal rosinate is at least in part potassium rosinate.

PIERRE DREWSEN.
JOHN R. LITTLE.